(12) United States Patent
Lapido et al.

(10) Patent No.: US 10,335,745 B2
(45) Date of Patent: Jul. 2, 2019

(54) BASE STABLE SEMIPERMEABLE MEMBRANE AND METHODS THEREOF

(71) Applicant: AMS TECHNOLOGIES INT. (2012) LTD, Or-Yehuda (IL)

(72) Inventors: Polina Lapido, Rishon Le Zion (IL); Vera Ginzburg, Rehovot (IL); Hagit Shalev, Ashdod (IL); Boris Ginzburg, Rehovot (IL)

(73) Assignee: AMS TECHNOLOGIES INT. (2012) LTD, Or-Yehuda (IL)

( * ) Notice: Subject to any disclaimer, the term of this patent is extended or adjusted under 35 U.S.C. 154(b) by 8 days.

(21) Appl. No.: 15/025,419

(22) PCT Filed: Sep. 18, 2014

(86) PCT No.: PCT/IL2014/050836
§ 371 (c)(1),
(2) Date: Mar. 28, 2016

(87) PCT Pub. No.: WO2015/044941
PCT Pub. Date: Apr. 2, 2015

(65) Prior Publication Data
US 2016/0207010 A1    Jul. 21, 2016

Related U.S. Application Data

(60) Provisional application No. 61/884,062, filed on Sep. 29, 2013.

(51) Int. Cl.
*B01D 61/02* (2006.01)
*B01D 67/00* (2006.01)
(Continued)

(52) U.S. Cl.
CPC ............ *B01D 71/60* (2013.01); *B01D 61/027* (2013.01); *B01D 69/02* (2013.01); *B01D 69/125* (2013.01);
(Continued)

(58) Field of Classification Search
None
See application file for complete search history.

(56) References Cited

U.S. PATENT DOCUMENTS

| | | |
|---|---|---|
| 7,575,687 B2 | 8/2009 | Kurth et al. |
| 7,909,179 B2 | 3/2011 | Kurth et al. |
| 8,092,918 B2 | 1/2012 | Kurth et al. |

FOREIGN PATENT DOCUMENTS

| | | |
|---|---|---|
| EP | 0884096 A1 | 12/1998 |
| WO | 2010/082194 A2 | 7/2010 |
| WO | 2015/044941 A1 | 4/2015 |

OTHER PUBLICATIONS

International Search Report of PCT/IL2014/050836, dated Dec. 16, 2014.
(Continued)

*Primary Examiner* — Krishnan S Menon

(57) ABSTRACT

The present invention provides a semipermeable membrane having enhanced alkaline stability and a method of forming a semipermeable membrane having enhanced alkaline stability, comprising steps of: providing an ultrafiltration (UF) base membrane, immersing said UF membrane in a solution comprising at least one substance selected from the group consisting of a polymer preferably polyethylenimine (PEI), a condensate solution and a mixture thereof, thereby forming reactive moieties upon said UF membrane, and forming at least one first layer upon at least portion of said UF base support membrane by immersing said UF base support membrane of step (b) in a solution comprising at least one ingredient selected from the group consisting of polymer
(Continued)

preferably polyethylenimine (PEI), condensate solution and a mixture thereof thereby forming a cross-linked skin on the surface of said base membrane.

5 Claims, 3 Drawing Sheets

(51) Int. Cl.
    *B01D 69/02*     (2006.01)
    *B01D 69/12*     (2006.01)
    *B01D 71/58*     (2006.01)
    *B01D 71/60*     (2006.01)
    *B01D 71/68*     (2006.01)

(52) U.S. Cl.
    CPC ............. *B01D 71/58* (2013.01); *B01D 71/68* (2013.01); *B01D 67/0093* (2013.01); *B01D 2323/08* (2013.01); *B01D 2323/30* (2013.01); *B01D 2323/40* (2013.01); *B01D 2325/20* (2013.01); *B01D 2325/30* (2013.01)

(56) References Cited

OTHER PUBLICATIONS

International Search Authority Written Opinion of PCT/IL2014/050836, dated Dec. 16, 2014.

BASE STABLE SEMIPERMEABLE MEMBRANE AND METHODS THEREOF

CROSS REFERENCE

This application is a national phase of PCT Application Number PCT/IL2014/050836, filed on Sep. 18, 2014, which claims priority from provisional application No. 61/884,062, filed on Sep. 29, 2013. All of these applications are hereby incorporated by reference in their entirety.

FIELD OF INVENTION

The present invention relates to semipermeable membranes having enhanced base or alkaline stability. More particularly, the present invention relates to methods of manufacture semipermeable membranes with improved base or alkaline stability and high effective performance lifetime in selective separation processes.

BACKGROUND OF THE INVENTION

Semipermeable membranes possess a major part in industrial processing technology, commercial and consumer applications. Examples of their applications include, among others, biosensors, transport membranes, drug delivery systems, water purification systems, optical absorbers, and selective separation systems for aqueous and organic liquids carrying dissolved or suspended components.

Semipermeable membranes operate in separation devices by allowing only certain components of a solution or dispersion to preferentially pass through the membrane. Representative examples include U.S. Pat. No. 7,575,687 discloses methods for purifying caustic feed streams using membranes that comprise polysulfonamide matrices. The invention further discloses polysulfonamide membranes which possess a combination of flow, rejection, and caustic stability that make them a viable commercial option for fractionating caustic streams especially generated by a Bayer alumina recovery process.

U.S. Pat. No. 7,909,179 discloses a method for preparing a modified insoluble branched condensation polymer matrix comprising step of treating an insoluble branched condensation polymer matrix comprising reactant residues and having a plurality of primary or secondary amine groups, with a compound of the formula Ar-SO2-X, wherein each X is a leaving group and each Ar is an aryl group or a heteroaryl group.

U.S. Pat. No. 8,092,918 discloses polymer matrices and methods for preparing polymer matrices, as well as methods for purifying caustic feed streams using membranes that comprise polysulfonamide matrices.

There is variety of industrial applications that could benefit from the advantages of membrane technology; membranes possessing the proper and diverse combination of stability and selectivity are available. However a required combination of preforming separation whilst having base stability characteristics is still needed.

Therefore, there is a long felt and unmet need for means and methods of forming a cost-effective alkaline stable membrane for removing impurities from basic streams.

SUMMARY OF THE INVENTION

It is one object the present invention to provide a method of forming a semipermeable membrane having enhanced alkaline stability, wherein comprising steps of:

a. providing an ultrafiltration (UF) base membrane;
b. immersing said UF membrane in a solution comprising at least one substance selected from the group consisting of a polymer preferably polyethylenimine (PEI), a condensate solution and a mixture thereof, thereby forming reactive moieties upon said UF membrane; and,
c. forming at least one first layer upon at least portion of said UF base support membrane by immersing said UF base support membrane of step (b) in a solution comprising at least one ingredient selected from the group consisting of polymer preferably polyethylenimine (PEI), condensate solution and a mixture thereof thereby forming a cross-linked skin on the surface of said base membrane.

It is another object of the present invention to provide the method as defined in any of the above, wherein said aid method additionally comprising steps of:

a. providing a modification solution comprising at least one polymer preferably PEI and a condensate solution; and
b. forming at least one first layer upon at least portion of said UF base support membrane by immersing said UF membrane in said modification solution thereby, forming a cross-linked skin upon the surface of said UF membrane.

It is another object of the present invention to provide the method as defined in any of the above wherein said method additionally comprising step of heating said modification solution to a temperature of about 50° C. for about 1 hour.

It is another object of the present invention to provide the method as defined in any of the above wherein said method additionally comprising step of repeating step a,b,c n times for providing n layers; said n is an integer equals to or greater than 1.

It is another object of the present invention to provide the method as defined in any of the above wherein said method additionally comprising step of actively increasing a cross-linked reaction between the reactive moieties upon the surface of said UF base membrane and said PEI by elevating temperature in room temperature or in the range of about 60-90° C.

It is another object of the present invention to provide the method as defined in any of the above wherein said UF base membrane is preferably a non-cross-linked base polymer.

It is another object of the present invention to provide the method as defined in any of the above wherein said method additionally comprising step of forming at least one second layer upon said first layer by immersing said UF membrane of step (c) in said PEI solution and said condensate solution in heat-treatment conditions in the range of about 60 to about 90° C. thereby, forming a cross-linked skin upon said first layer.

It is another object of the present invention to provide the method as defined in any of the above wherein said step (a) additionally comprising step of providing UF base support membrane comprising a polyethersulfone (PES) or polysulfone(PS) groups.

It is another object of the present invention to provide the method as defined in any of the above wherein said method additionally comprising step of selecting said condensate from the group consisting of cyanuric chloride, sulfanilic acid and any combination thereof.

It is another object of the present invention to provide the method as defined in any of the above wherein said step of forming at least one first layer additionally comprising step of electrostatically bonding said condensate to said UF membrane.

It is another object of the present invention to provide the method as defined in any of the above wherein said method additionally comprising steps of curing said first layer in alkaline solution followed by heating treatment at about 90° C. in order to complete the cross-linking reaction step.

It is another object of the present invention to provide the method as defined in any of the above wherein said step of providing said UF base support membrane comprising preferably polyethersulfone(PES) groups.

It is another object of the present invention to provide the method as defined in any of the above wherein said step of providing UF base support is with molecular weight in the range of about 5k to about 30k.

It is another object of the present invention to provide the method as defined in any of the above wherein said step of providing UF membrane is preferably with molecular weight of about 20k.

It is another object of the present invention to provide the method as defined in any of the above wherein said step of forming a stable membrane in feed solution stable in an environment having a pH in the range of about 2 to about 14.

It is another object of the present invention to provide the method as defined in any of the above wherein said method additionally comprising step of immersing said membrane in 20% solution of acid in water at about 70 to 90° C. for a period of about 18-24 hours.

It is another object of the present invention to provide the method as defined in any of the above wherein said step of immersing said UF support membrane in said solution comprising about 0.05 to about 0.3% w/w of said condensate for about 1 to about 3 hours at a temperature not more than about 70° C.

It is another object of the present invention to provide the method as defined in any of the above wherein said method additionally comprising step of contacting said UF support membrane with 0.1% to about 1% polyethylenimine (PEI) solution followed by heat-treatment at temperature of about 70 to about 90° C.

It is another object of the present invention to provide the method as defined in any of the above wherein said step of providing said first layer is in an alkaline feed solution having a pH of about 11.

It is another object of the present invention to provide the method as defined in any of the above wherein said method additionally comprising step of forming a Nanofiltration layer upon said UF comprising at least one di-, tri- or tetra-halo substituted diazine or triazine-containing monomer, oligomer or polymer, and at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl.

It is another object of the present invention to provide the method as defined in any of the above wherein said diazine or triazine-containing monomer or oligomer is selected from the group consisting of:

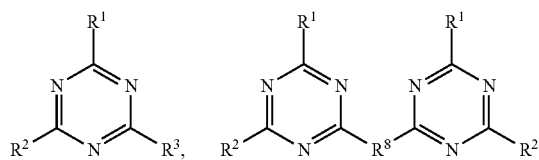

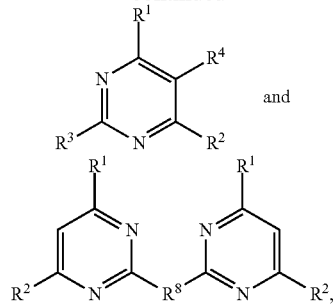

wherein:

$R^1$ is independently selected at each occurrence from bromo, chloro, iodo, fluoro, —$NHR^5$, —$OR^5$ and $SR^5$, wherein $R^5$ is independently selected at each occurrence from H, optionally substituted alkyl and optionally substituted aryl;

$R^2$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;

$R^3$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;

$R^4$ is selected from H, bromo, chloro, fluoro, —$NHR^5$, —$OR^5$ and $SR^5$, wherein $R^5$ is independently selected at each occurrence from H, optionally substituted alkyl and optionally substituted aryl; and $R^8$ is independently selected at each occurrence from —$NH_2$— and —NH-A-NH—, wherein A is selected from $C_{1-20}$ aliphatic moieties, $C_{6-10}$ aromatic moieties, and combinations thereof; provided that at at least two occurrences, $R^1$, $R^2$, $R^3$ and $R^4$, taken together, are selected from bromo, chloro and fluoro, and further provided that when both $R^1$ and $R^2$ on a single ring are Cl, at least one of $R^3$ and $R^4$ is not Cl.

It is another object of the present invention to provide the method as defined in any of the above wherein said multifunctional amine has a molecular weight of in the range of 400 to 750,000.

It is another object of the present invention to provide the method as defined in any of the above wherein said method additionally comprising step of forming a membrane having rejection of more than 95% Glucose in 5% glucose feed solution.

It is another object of the present invention to provide the method as defined in any of the above wherein said membrane after soaking in 20%$_{w/w}$ NaOH in water at 40° C. yield more than 97% glucose rejection. (FIG. 1)

It is another object of the present invention to provide the method as defined in any of the above wherein said membrane applied pressure of about 10 bars to 40 bars in 3.5% NaOH solution at 40° C. is in direct correlation with the membrane flux.

It is another object of the present invention to provide the method as defined in any of the above wherein said membrane after soaking in 20%$_{w/w}$ NaOH in water, at 40° C. for a period of about 5 to 130 hours, yield more than 97% glucose rejection.

It is another object of the present invention to provide the method as defined in any of the above wherein said membrane after soaking in a complex of Cu(EDTA) with 20%$_{w/w}$ NaOH solution, at 70° C. for a period of about 260 to 450 hours yield more than 97% glucose rejection.

It is another object of the present invention to provide the method as defined in any of the above, wherein said membrane after soaking in 1%$_{w/w}$ NaAlO$_2$ in 3.5%$_{w/w}$ sodium hydroxide solution at about 40° C. to about 60° C. for about 240 hours, yield more than 80% rejection.

It is another object of the present invention to provide a semipermeable membrane having an enhanced alkaline stability, said semipermeable membrane comprising a Nanofiltration layer, characterized by at least one of the following:
  a. said Nanofiltration layer comprises a matrix which is bound to an UF base membrane;
  b. said Nanofiltration layer contains a matrix that has been formed from at least one substrate selected from the group consisting of di-, tri- or tetra-halo substituted diazine or triazine-containing monomer, oligomer or polymer, at least one multifunctional amine having a molecular weight in the range of about 400 to about 750,000, provided that at least one of the di-, tri- or tetra-halo substituted diazine or triazine-containing monomer, oligomer or polymer is not a di- or triazine monomer which is substituted only by Cl,
  and any combination thereof.

It is another object of the present invention to provide the semipermeable membrane as defined in any of the above, wherein said Nanofiltration layer, when exposed to 20%$_{w/w}$ NaOH solution at about 40° C. for 140 day, maintains rejection of about 95%.

It is another object of the present invention to provide the semipermeable membrane as defined in any of the above, wherein said Nanofiltration layer, when exposed to 10%$_{w/w}$ NaOH at 70° C. for about 450 hours, removes at least 97% of Cu(ETDA) at a flux greater than 21 LMH from a feed solution of 0.4%$_{w/w}$ Cu(ETDA) in 10% NaOH when the feed solution is applied to said Nanofiltration layer at a feed pressure of about 30 bar and a temperature of 25° C., It is another object of the present invention to provide the semipermeable membrane as defined in any of the above, wherein said Nanofiltration layer, when exposed to 1% w/v NaAlO$_2$ at 40° C. for about 240 hours, removes at least 85.4% of impurities from a feed solution of 3.5% NaOH when the feed solution is applied to said Nanofiltration layer at a feed pressure of 15 bars and a temperature of about 25° C.

It is another object of the present invention to provide the semipermeable membrane as defined in any of the above, wherein said diazine or triazine-containing monomer or oligomer is selected from the group consisting of:

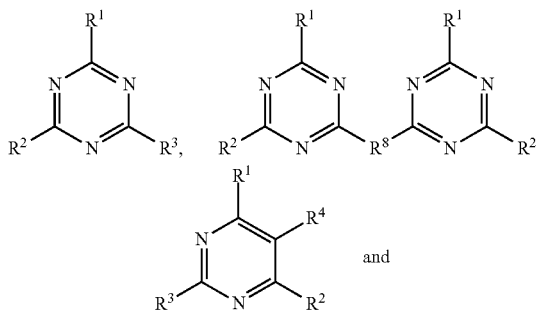

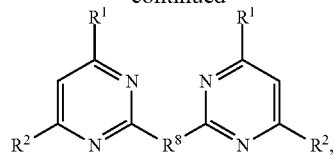

wherein;
R$^1$ is independently selected at each occurrence from bromo, chloro, iodo, fluoro, —NHR$^5$, —OR$^5$ and SR$^5$, wherein R$^5$ is independently selected at each occurrence from H, optionally substituted alkyl and optionally substituted aryl;
R$^2$ is independently selected at each occurrence from bromo, chloro, fluoro, —NHR$^5$, —OR$^5$ and SR$^5$, wherein R$^5$ is independently selected at each occurrence from H, optionally substituted alkyl and optionally substituted aryl;
R is independently selected at each occurrence from bromo, chloro, fluoro, —NHR$^5$, —OR$^5$ and SR$^5$, wherein R$^5$ is independently selected at each occurrence from H, optionally substituted alkyl and optionally substituted aryl;
R$^4$ is selected from H, bromo, chloro, fluoro, —NHR$^5$, —OR$^5$ and SR$^5$, wherein
R$^5$ is independently selected at each occurrence from H, optionally substituted alkyl and optionally substituted aryl; and
R$^8$ is independently selected at each occurrence from —NH$_2$— and —NH-A-NH—, wherein A is selected from C$_{1-20}$ aliphatic moieties, C$_{6-10}$ aromatic moieties, and combinations thereof;
provided that at least two occurrences, R$^1$, R$^2$, R$^3$ and R$^4$, taken together, are selected from bromo, chloro and fluoro, and further provided that when both R$^1$ and R$^2$ on a single ring are Cl, at least one of R$^3$ and R$^4$ is not Cl.

It is another object of the present invention to provide the semipermeable membrane as defined in any of the above, wherein said UF base support membrane comprising polyethersulfone (PES) or polysulfone(PS) groups.

It is another object of the present invention to provide an alkaline stable semipermeable membrane prepared by steps of:
  a. providing an ultrafiltration (UF) base membrane;
  b. providing a modification solution comprising at least one substance selected from the group consisting of a polymer preferably PEI, a condensate solution and a mixture thereof;
  c. forming at least one first layer upon at least one portion of said UF base support membrane by immersing said UF membrane in said modification solution thereby, forming a cross-linked skin on the surface of said UF membrane.

It is another object of the present invention to provide the semipermeable membrane as defined in any of the above, wherein additionally comprising step immersing said UF membrane in a condensate solution to form reactive moieties upon said UF membrane.

It is another object of the present invention to provide the semipermeable membrane as defined in any of the above, wherein additionally comprising step immersing said UF base support membrane in said solution comprising polymer preferably polyethylenimine (PEI), thereby forming a cross-linked skin on the surface of said alkaline membrane.

It is another object of the present invention to provide the semipermeable membrane as defined in any of the above, wherein additionally comprising step of actively increasing a cross-linked reaction between said reactive moieties upon the surface of said UF base membrane and said PEI at room temperature or by elevating temperature in the range of about 60-90° C.

It is another object of the present invention to provide the semipermeable membrane as defined in any of the above, wherein additionally comprising steps of repeating at least one of said steps b, c and a combination thereof n times for providing n layers; said n is an integer equals to or greater than 1.

It is another object of the present invention to provide the semipermeable membrane as defined in any of the above, wherein additionally comprising steps of forming at least one second layer upon said first layer by immersing said UF membrane of step (c) in said PEI solution and said condensate solution, thereby, forming a cross-linked skin upon said first layer.

It is another object of the present invention to provide the semipermeable membrane as defined in any of the above, wherein said step (a) additionally comprising step of providing UF base support membrane comprising polyethersulfone (PES) or polysulfone(PS).

It is another object of the present invention to provide the semipermeable membrane as defined in any of the above, wherein said condensate is selected from the group consisting of cyanuric chloride, sulfanilic acid and any combination thereof.

It is another object of the present invention to provide the semipermeable membrane as defined in any of the above, wherein additionally comprising steps of curing at least said first layer in alkaline solution.

It is another object of the present invention to provide the semipermeable membrane as defined in any of the above, wherein said step of providing said UF base support membrane comprising preferably polyethersulfone(PES).

It is another object of the present invention to provide the semipermeable membrane as defined in any of the above, wherein said step of providing UF base support is with molecular weight in the range of about 5k to about 30k.

It is another object of the present invention to provide the semipermeable membrane as defined in any of the above, wherein said step of providing UF membrane is preferably with molecular weight of about 20k.

It is another object of the present invention to provide the semipermeable membrane as defined in any of the above, wherein additionally comprising step of forming at least one layer upon at least a portion of said UF base membrane thereby forming a stable composite membrane in feed solution in an environment having a pH in the range of about 2 to about 14.

It is another object of the present invention to provide the semipermeable membrane as defined in any of the above, wherein additionally comprising step of curing said membrane in alkaline solution following a heat treatment in about 90° C. in order to complete the cross-linking reaction step.

It is another object of the present invention to provide the semipermeable membrane as defined in any of the above, wherein additionally comprising step of immersing said base stable semipermeable membrane in 20% solution of acid solution at about 70° C. to about 90° C. for a period of about 18 to 24 hours.

It is another object of the present invention to provide the semipermeable membrane as defined in any of the above, wherein said step of immersing said UF membrane in aqueous solution containing about 0.05 to about 0.3% w/w of said condensate for about 1 to 3 hour at a temperature of not more than about 70° C.

It is another object of the present invention to provide the semipermeable membrane as defined in any of the above, wherein said step of immersing said UF base support membrane in said solution comprising PEI additionally comprising step of contacting said UF support membrane with 0.1% to about 1% polyethylenimine (PEI) solution followed by heat-treatment at a temperature of about 70 to about 90° C.

It is another object of the present invention to provide the semipermeable membrane as defined in any of the above, wherein additionally comprising step of forming a Nanofiltration layer comprising at least one di-, tri- or tetra-halo substituted diazine or triazine-containing monomer, oligomer or polymer, and at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl.

It is another object of the present invention to provide the semipermeable membrane as defined in any of the above, wherein said membrane is with a rejection of at least 95% Glucose in 5% glucose in a feed solution.

It is another object of the present invention to provide the semipermeable membrane as defined in any of the above, wherein said membrane in applied pressure of about 10 bars to 40 bars at a room temperature is in direct correlation with the membrane glucose rejection.

It is another object of the present invention to provide the semipermeable membrane as defined in any of the above, wherein said membrane after soaking in $20\%_{w/w}$ NaOH solution at 40° C. yields more than 97% glucose rejection.

It is another object of the present invention to provide the semipermeable membrane as defined in any of the above, wherein said membrane in applied pressure of about 10 bars to 40 bars in 3.5% NaOH solution at 40° C. is in direct correlation with the membrane yield flux.

It is another object of the present invention to provide the semipermeable membrane as defined in any of the above, wherein said membrane after soaking in a complex of Cu(EDTA) with $20\%_{w/w}$ NaOH solution, at 70° C. for periods of about 260 to 450 hours, yield more than 97% glucose rejection.

It is another object of the present invention to provide the semipermeable membrane as defined in any of the above, wherein said membrane after soaking in $1\%_{w/v}$ $NaAlO_2$ in $3.5\%_{w/w}$ sodium hydroxide solution at 40° C. to 60° C., yield more than 80% rejection for about 240 hours.

It is another object of the present invention to provide a method of forming a semipermeable membrane having enhanced stability to solvent and acid, comprising steps of:
 a. providing a ultrafiltration (UF) base membrane;
 b. immersing said UF membrane in a condensate solution to form reactive moieties upon said UF membrane; and,
 c. immersing said UF base support membrane of step (b) in said solution comprising polymer preferably polyethylenimine (PEI), thereby forming a cross-linked skin on the surface of said base membrane.

It is another object of the present invention to provide the method as defined in any of the above, wherein said method additionally comprising step of actively increasing a cross-linked reaction between said reactive moieties upon the surface of said UF base membrane and said PEI.

It is another object of the present invention to provide the method as defined in any of the above, wherein said step of actively increasing a cross-linked reaction is at room temperature or by elevating temperature in the range of about 60-90° C.

It is another object of the present invention to provide the method as defined in any of the above, wherein said method additionally comprising steps of repeating at least one of said steps b, c n times for providing n layers; wherein said n is an integer equals to or greater than 1.

It is another object of the present invention to provide the method as defined in any of the above, wherein said UF base membrane is preferably a non-cross-linked base polymer.

It is another object of the present invention to provide the method as defined in any of the above, wherein said method additionally comprising step of forming at least one first layer upon said UF base support membrane by immersing said UF base support membrane of step (c) in said solution comprising PEI for functionalizing said support membrane surface.

It is another object of the present invention to provide the method as defined in any of the above, wherein said method additionally comprising step of forming at least one second layer upon said first layer by immersing said UF membrane of step (e) in said PEI solution and said condensate solution, thereby, forming a cross-linked skin on said first layer.

It is another object of the present invention to provide the method as defined in any of the above, wherein said step (a) additionally comprising step of providing UF base support membrane comprising polyacrylonitrile (PAN).

It is another object of the present invention to provide the method as defined in any of the above, wherein said providing UF base support membrane comprising PAN cross-linked by It is another object of the present invention to provide the method as defined in any of the above, wherein said method additionally comprising steps of curing at least first layer in alkaline solution having a pH of about 11.

It is another object of the present invention to provide the method as defined in any of the above, wherein said method additionally comprising steps of repeating at least one of said steps a, b. c n times for providing n layers; wherein said n is an integer equals to or greater than 1.

It is another object of the present invention to provide the method as defined in any of the above, wherein said condensate is selected from the group consisting of cyanuric chloride, sulfanilic acid and a combination thereof.

It is another object of the present invention to provide the method as defined in any of the above, wherein said method additionally comprising step of layering on at least a portion of said UF base membrane thereby forming a stable composite membrane in feed solution stable in an acid environment having a pH in the range of about 0 to about 12.

It is another object of the present invention to provide the method as defined in any of the above, wherein said method additionally comprising step of curing said support membrane in alkaline solution followed by heat treatment at 90° C. in order to complete the cross-linking reaction step.

It is another object of the present invention to provide the method as defined in any of the above, wherein said step of forming second layer is performed in heat-treatment conditions in the range of about 60 to about 90° C.

It is another object of the present invention to provide the method as defined in any of the above, wherein said method additionally comprising step of treating said solvent and acid stable semipermeable membrane in 20% solution of acid in water at about 70 to 90° C. for a period of about 18-24 hours.

It is another object of the present invention to provide the method as defined in any of the above, wherein said solvent and acid stable semipermeable membrane is with rejecting of more than 95% Glucose in 5% glucose in a feed solution.

It is another object of the present invention to provide the method as defined in any of the above, wherein said step of immersing said UF base support membrane in said solution comprising PEI additionally comprising step of contacting said UF support membrane with 0.1% to about 1% polyethylenimine (PEI) solution followed by heat-treatment at a temperature of about 70 to about 90° C.

It is another object of the present invention to provide the method as defined in any of the above, wherein said method additionally comprising step of forming a Nanofiltration base membrane comprising at least one di-, tri- or tetra-halo substituted diazine or triazine-containing monomer, oligomer or polymer, and at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl.

It is another object of the present invention to provide the method as defined in any of the above, wherein said Nanofiltration layer comprising at least one di-, tri- or tetra-halo substituted diazine or triazine-containing monomer, oligomer or polymer, and at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl.

It is another object of the present invention to provide the method as defined in any of the above, wherein said diazine or triazine-containing monomer or oligomer is selected from the group consisting of:

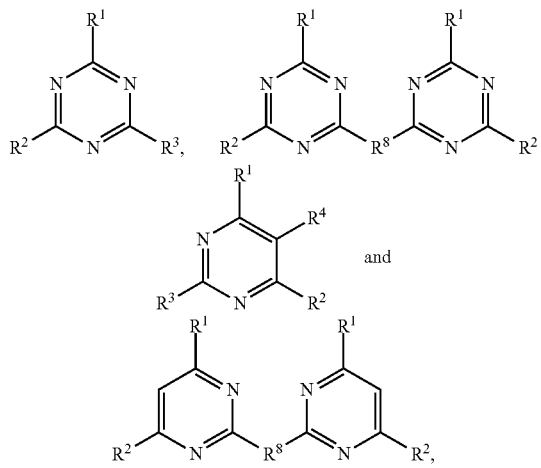

wherein;

$R^1$ is independently selected at each occurrence from bromo, chloro, iodo, fluoro, —$NHR^5$, —$OR^5$ and $SR^5$, wherein $R^5$ is independently selected at each occurrence from H, optionally substituted alkyl and optionally substituted aryl;

$R^2$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;

$R^3$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;

$R^4$ is selected from H, bromo, chloro, fluoro, —$NHR^5$, —$OR^5$ and $SR^5$, wherein $R^5$ is independently selected at each occurrence from H, optionally substituted alkyl and optionally substituted aryl; and $R^8$ is independently selected at each occurrence from —$NH_2$— and —NH-A-NH—, wherein A is selected from $C_{1-20}$ aliphatic moieties, $C_{6-10}$ aromatic moieties, and combinations thereof;

provided that at least two occurrences, $R^1$, $R^2$, $R^3$ and $R^4$, taken together, are selected from bromo, chloro and fluoro, and further provided that when both $R^1$ and $R^2$ on a single ring are Cl, at least one of $R^3$ and $R^4$ is not Cl.

It is another object of the present invention to provide the method as defined in any of the above, wherein said multifunctional amine has a molecular weight of in the range of 400 to 750,000.

It is another object of the present invention to provide the method as defined in any of the above, wherein said membrane after soaking said membrane in 20%$_{w/w}$, $H_2SO_4$ at 90° C. for a period of about 24 to 300 hours yield more than 96% glucose rejection.

It is another object of the present invention to provide the method as defined in any of the above, wherein said membrane after soaking said membrane in 100%$_{w/w}$ N-methylpyrrolidone (NMP) at 60° C. for a period of about 24 to 300 hours yield more than 96% glucose rejection.

BRIEF DESCRIPTION OF THE DRAWINGS

In the following description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

In the accompanying drawing.

DETAILED DESCRIPTION OF THE PREFERRED EMBODIMENTS

Figure 1A:
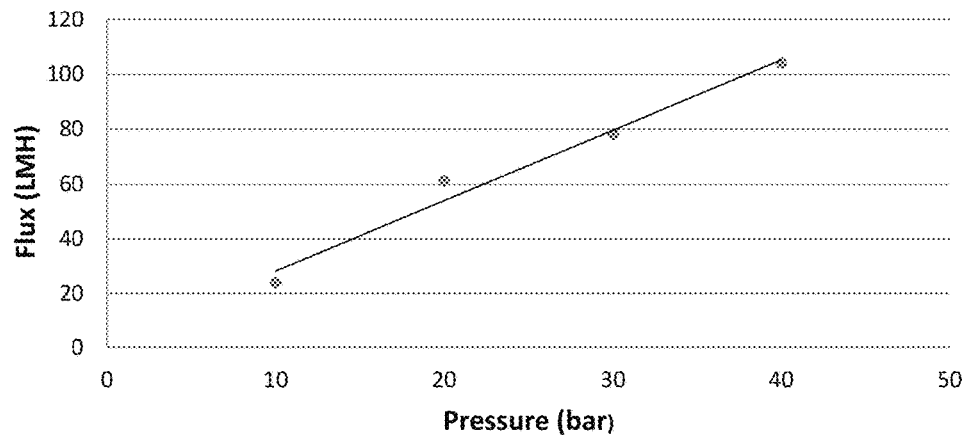
FIGS. 1A-B present a graph of the membrane Flux and rejection vs. Pressure in RO water in accordance with a preferred embodiment of the present invention.

The present invention has been defined specifically to provide products methods and means for preparing an alkaline stable semipermeable membrane.

The semipermeable membrane comprises ultrafiltration (UF) base support membrane and a Nanofiltration(NF) membrane. The NF is a layer which is formed over at least a portion of an ultrafiltration (UF) support membrane. Furthermore, the NF layer is bonded to a non-cross-linked base polymer having functional groups. Therefore, the UF base polymer is being modified by encapsuling an NF layer onto the UF base polymer thereof.

The present invention provides a semipermeable membrane with high chemical stability in aggressive operating conditions selected from the group consisting of extreme pH levels, high alkalinity concentrations presence of organic solutions, pressure, temperature and any combination thereof. Alternatively, the semipermeable membrane may be a free-standing membrane.

The membrane of the present invention is characterized by at least one of the following: (i) alkaline stability (10-20% alkaline concentrations) for removing impurities from concentrated mineral bases, (ii) stability in high alkaline conditions for separations in pharmaceutical, chemical and metal industries, (iii) compaction stability under high applied hydrostatic pressures at elevated temperatures, and in the presence of organic solvents for performing separations in many types of industrial wastewater streams, (iv) separating soluble catalysts from organic solvent streams in extreme pH conditions and or highly reactive environments.

In accordance with another preferred embodiment of the present invention, the membrane of the present invention is useful in metal production and Processing, Pharmaceuticals industry, Chemicals industry, Food and Beverage industry, Agricultural industry, Paper and Pulp industry, Rayon industries, Petroleum production, Alkali and/or acid recovery, Metals, organics, Sulfate removal, Chloro-alkali production, Silica removal and Aluminate purification.

In accordance with another preferred embodiment of the present invention, a method of forming a polymeric semipermeable membrane comprising steps of providing a non-cross-linked UF base membrane. The UF membrane is immersed in a condensate solution to form reactive pendant moieties upon the UF membrane. Furthermore, by effecting a cross-linking reaction between the reactive pendant moieties on a surface of the base polymer with an oligomer or another polymer preferably polyethylenimine PEI, thereby forming a cross-linked skin on the surface of the base polymer.

The ultrafiltration membrane is a support polymer having a support (non-woven) polymer preferably polypropylene (PP).

In another embodiment of the present invention 'Alkalinity' or 'Alkaline' refers herein to a soluble base which contains and releases OH⁻ ions quantitatively i.e., a pH higher than 7.0 at standard conditions. Furthermore Alkalinity may further refer to the amount of bases in a solution that can be converted to uncharged species by a strong acid. Alkalinity or $A_T$ further indicates or measures the ability of a solution to neutralize acids to the equivalence point of carbonate or bicarbonate.

The term "Semipermeable membranes" refers herein to membranes which retain small particulates and microbes having pores size of an average diameter of greater than about 0.1 microns. The upper pore size limitation of microfiltration membranes may be considered to be about 10 microns. Typically, these membranes allow the permeation of smaller components, such as simple salts, dissolved organic materials having a molecular weight of less than about 100,000 and colloidal particles that have physical dimensions that are smaller than pores of MF membrane. Semipermeable membranes possess the highest water permeability of the four classes of membranes, due to their large pore diameters as well as their typical high pore density. The pure water permeability of these membranes is commonly greater than about 5,000 liter/($m^2 \times h \times bar$).

The term "ultrafiltration(UF) membrane" refers herein to an asymmetric base membrane which at one face thereof has pores of smaller diameter than at the opposite face. The Ultrafiltration (UF) membranes of the present intention are characterized by pore sizes of from about 0.1 micron to about 5 nanometers. UF membranes are commonly classified by their ability to retain specific-sized components dissolved in a solution. This is referred to as the molecular weight cut-off (MWCO). In another embodiments, the UF membranes of the present invention are used to retain proteins, starches, and other relatively large dissolved materials while allowing the permeation of simple salts and smaller dissolved organic compounds. The water permeability of UF membranes is commonly in the range of from about A=100 liter/($m^2 \times h \times bar$) to about A=5000 liter/($m^2 \times h \times bar$).

The term "Nanofiltration (NF) membranes" refers herein to membranes which possess the ability to fractionate small compounds (i.e., those with molecular weights less than 1000). The small compounds are often salts, and NF membranes are commonly used to permeate monovalent ions while retaining divalent ions.

In another embodiment of the present invention, NF membranes typically possess ionized or ionizable groups on their surfaces, including within the pores. Although not wishing to be bound by theory, it is believed that NF membranes can affect the separation of ionic materials through a charge-based interaction mechanism. NF membranes also can be used to separate uncharged organic compounds, sometimes in solvents other than water or to separate organic molecules from salts. The water permeability of NF membranes is commonly in the range of from about A=I liter/($m^2 \times h \times bar$) to about A=IO liter/($m^2 \times h \times bar$).

The term "Reverse osmosis (RO) membranes" refers herein to components other than the permeating solvent (usually water). RO membranes, similar to NF membranes, can contain ionic functional groups. RO membranes are commonly used to remove salt from water and to concentrate small organic compounds. The water permeability of reverse osmosis membranes is commonly in the range of from about A=0.2 liter/($m \times h \times bar$) to about A=5 liter/($m^2 \times h \times bar$). Although the mechanisms that govern membrane performance are not exactly defined, some basic theories have been postulated. A review of some membrane transport theories can be found in The Solution Diffusion Model: A Review, J. G. Wijmans, R. W. Baker, J. Membrane Science, 1995, vol. 107, pp. 1-21, the contents of which are incorporated herein by reference.

The term "Condensate" refers herein to any molecule or compound which function as a cross-linker agent. The condensate may be a condensation polymer which is formed through a condensation reaction where molecules join together—losing small molecules as by-products such as water or methanol, as opposed to addition polymers which involve the reaction of unsaturated monomers. Cationic and anionic polymerization and condensation polymerization systems may also be used to modify the surface layers.

The term "about" applies hereinafter to a measure being ±25% of the defined value.

The present invention provides a method of forming a alkaline stable semipermeable membrane comprising the steps of: (a) providing a ultrafiltration (UF) base support membrane, (b) providing a aqueous solution containing condensate, (c) immersing the UF base support membrane in the aqueous solution containing condensate which forms an electrostatic attraction, (d) providing a solution comprising polyethylenimine (PEI), (e) forming at least one first layer upon the UF base support membrane by immersing the UF base support membrane comprising the condensate in the solution comprising PEI for functionalizing the first layer, (f) forming at least one second layer upon the first layer by immersing the PEI with the condensate solution, thereby forming a cross-linked skin on the first layer.

In another embodiment, the steps (a)-(f) may optionally may be repeated n number of times to give multiple cross-linked layers, wherein n is an integer equals to or greater than 1.

In another embodiment of the present invention a method of forming a semipermeable membrane having alkaline stability is provided. The method comprising the steps of providing a UF support membrane such as Polyethersulfone (PES) support membrane. The support membrane may further be subjected to a cleaning step with alkaline solution in reverse osmosis water (ROW). A modification solution was prepared and mixed comprising about 1% polyethylenimine (PEI) and about 0.3% condensate comprising cyanuric chloride and sulfonilic acid. The modification solution was further heated to about 50° C. for about 3 hour. The support membrane may further immersed in the modification solution for about 18 hours at a room temperature (RT), and further heated to about 50° C. for about 1 hour, forming at least one first layer upon at least portion of the UF or PES base support membrane by immersing said UF membrane in the modification solution thereby, forming a cross-linked skin upon the surface of the support membrane. After cooling and rinsing with ROW, the membrane is further immersed in aqueous solution containing 0.1% w/w of the condensate of cyanuric chloride and a sulfanilic acid for about 1 hour. Furthermore, the membrane comprising a first layer may further immersed for the curing step in alkaline solution, pH 11, for 2 hours at 70° C.

In another embodiment of the present invention, the formed crosslinked membrane may further comprise additional layers by optionally repeating the step of immersing the formed membrane in a modification solution n number of times to give multiple crosslinked layers, wherein n is an integer equals to or greater than 1. The repeatable step of immersing is in aqueous solution containing 0.1% w/w of the condensate of cyanuric chloride and a sulfanilic acid for 1 hour, and further comprising immersing in modification solution for 1 hour at RT following with curing step in alkaline solution, pH 11, for 2-3 hours at 70° C. After cooling and rinsing with ROW, the membrane again was immersed in aqueous solution containing 0.1% w/w of the condensate of cyanuric chloride and a sulfanilic acid for 1 hour, then the membrane was immersed in modification for 1 hour at room temperature (RT) and may further be followed with curing step in alkaline solution, pH 11, for 3-4 hours at 60-90° C.

In another embodiment of the present invention, the method of forming an alkaline stable semipermeable membrane further comprising step of actively increasing a cross-linked reaction at room temperature or/and by elevating temperature in the range of about 60-90° C. In another embodiment of the present invention, the formed membrane may further be placed in 20% solution of phosphoric acid in water at 90° C. for a period of about 18 hours.

In another embodiment of the present invention the formed semipermeable membrane may further have a flux of 115 LMH at 40 bar and 98% Glucose retention value.

The present invention provides a alkaline stable semipermeable membrane comprising an ultrafiltration membrane having a base polymer selected from the group consisting of polysulfones, polyether sulfones, polyphenylene sulfones and any combination thereof.

The ultrafiltration membrane having a base polymer is preferably comprising polyehersulfones having MWCO of about 5k-30k, and more preferably 20k.

In another embodiment of the present invention, the base polymer Polysulfone, polyether sulfone and polyphenylene sulfone are known to have very good stability in concentrated alkaline and are thus preferred polymers to be used as polymer.

The method of the present invention further comprising the step of providing a condensate comprising cyanuric chloride and sulfanilic acid. The condensate is chemisorbed within the UF membrane pores using electrostatic attraction.

The method of the present invention further comprising the step of providing a solution comprising polyethylenimine (PEI) thereby, forming a first layer upon the UF membrane comprising the condensate moieties, by immersing the UF base support membrane in a solution comprising PEI.

The present invention further comprising the step of functionalizing at least one first layer by increasing temperature in the range of about 60-70° C. for crosslinking PEI to the condensate reactive pendant moieties.

In another embodiment of the present invention, at least one second layer is formed comprising PEI which is further covalently bonded to the first layer. The method of the present invention, includes the step of layering on at least a portion of the UF base membrane first layer thereby forming a stable composite membrane in feed solution stable in an environment having a pH in the range of about 2 to about 14.

In another embodiment of the present invention, the method additionally comprising steps of curing at least one first layer in alkaline solution having a pH of about 11. The currying procedure provides a chemical treatment such as chemisorption procedure or dissolving procedure in a medium having a desired characteristics such as concentration, pH, pressure, temperature and any combination thereof.

In another embodiment of the present invention, the base supporting UF membrane is encapsulated by PES means thus forming PES encapsulation with PEI and the linked condensate.

The method further includes a membrane modification process with condensate and polyethylenimine (PEI) whilst exposing each separately upon the surface of UF support membrane.

In another embodiments of the present invention the method includes the step of bringing the condensate solution into contact with the at least a portion of the UF membrane having smaller pores for a time sufficient to effect bonding of the at least one di- or tri-halo substituted diazine or triazine-containing monomer, oligomer or polymer and the at least one multifunctional amine. In some embodiments, the multifunctional amine is selected from the group consisting of polyethylenimine, polyvinylamine, polyvinylanilines, polybenzylamines, polyvinylimidazolines, and amine-modified polyepihalohydrins. In some embodiments, the supplemental cross-linker is selected from the group consisting of 2,4,6-trichloro-s-triazine, 4,6-dichloro-2-sodium p-sulfoanile-s-triazine (4,6-dichloro-2-p-anilinesulfonic acid sodium salt-s-triazine), 4,6-dichloro-2-diethanolamine-s-triazine and 4,6-dichloro-2-amino-s-triazine.

The polymeric semipermeable membrane comprises a Nanofiltration(NF) layer formed which is bonded over at least a portion of the UF membrane. The method additionally comprising acid-treatment of the polymeric semipermeable membrane which was formed. The acid treatment includes 20% solution of acid in water at about 90° C. for a period of several hours. In another embodiment of the present invention, the cross-linking reaction includes reacting primary and secondary amino groups with halocarbon groups to form imine and tertiary amino groups.

In another embodiment of the present invention, a method for separating components in a liquid stream being basic or comprising steps of: providing a Semipermeable membrane comprising a Nanofiltration layer characterized by at least one of the following:

(a) the Nanofiltration layer comprises a matrix which is bound to an UF support membrane;

(b) (i) the Nanofiltration layer contains a matrix that has been formed from at least one substrate selected from the group consisting of di-, tri- or tetra-halo substituted diazine or triazine-containing monomer, oligomer or polymer, (ii) at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl and any combination thereof, (c) (i) the Nanofiltration layer, when exposed to $10\%_{w/w}$ NaOH at 70° C. for 450 hours, removes at least 97% of the impurities at a flux greater than 21 LMH from a feed solution of $0.4\%_{w/w}$ Cu(ETDA) in 10% NaOH when the feed solution is applied to the membrane at a feed pressure of 30 bar and a temperature of 25° C., (ii) after exposure of the Nanofiltration layer to 1% w/v $NaAlO_2$ at 40° C. for 240 hours, the Nanofiltration layer removes at least 85.4% of the impurities at a flux greater than 42 LMH from a feed solution of 3.5% NaOH when the feed solution is applied to the Nanofiltration layer at a feed pressure of 15 bars and a temperature of 25° C.

In another embodiment of the present invention, preferably operating pressures are in the range of 10-40 bars in the NF applications.

In another embodiment of the present invention, the Nanofiltration layer comprises at least one di-, tri- or tetra-halo substituted diazine or triazine-containing monomer, oligomer or polymer, and at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl. Nanofiltration layer optionally comprises at least one supplemental cross-linker.

In another embodiment of the present invention, the di-, tri- or tetra-halo substituted diazine or triazine-containing monomer or oligomer is selected from the group consisting of:

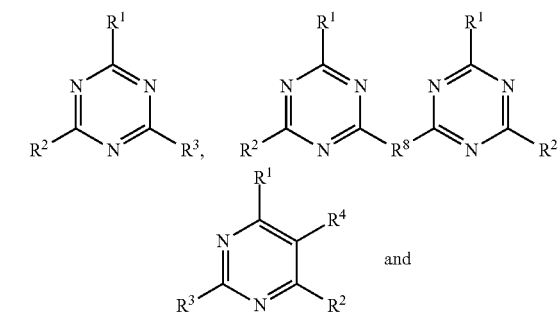

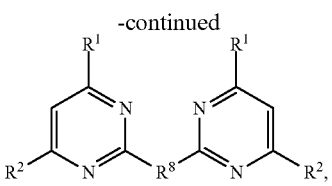

wherein;

R$^1$ is independently selected at each occurrence from bromo, chloro, iodo, fluoro, —NHR$^5$, —OR$^5$ and SR$^5$, wherein R$^5$ is independently selected at each occurrence from H, optionally substituted alkyl and optionally substituted aryl;

R$^2$ is independently selected at each occurrence from bromo, chloro, fluoro, —NHR$^5$, —OR$^5$ and SR$^5$, wherein R$^5$ is independently selected at each occurrence from H, optionally substituted alkyl and optionally substituted aryl;

R$^3$ is independently selected at each occurrence from bromo, chloro, fluoro, —NHR$^5$, —OR$^5$ and SR$^5$, wherein R$^5$ is independently selected at each occurrence from H, optionally substituted alkyl and optionally substituted aryl;

R$^4$ is selected from H, bromo, chloro, fluoro, —NHR$^5$, —OR$^5$ and SR$^5$, wherein R$^5$ is independently selected at each occurrence from H, optionally substituted alkyl and optionally substituted aryl; and R$^8$ is independently selected at each occurrence from —NH$_2$— and —NH-A-NH—, wherein A is selected from C$_{1-20}$ aliphatic moieties, C$_{6-10}$ aromatic moieties, and combinations thereof;

provided that at least two occurrences, R$^1$, R$^2$, R$^3$ and R$^4$, taken together, are selected from bromo, chloro and fluoro, and further provided that when both R$^1$ and R$^2$ on a single ring are Cl, at least one of R$^3$ and R$^4$ is not Cl.

In another embodiment of the present invention, the membrane may be formed following a multi layering process. The multi layering process is configured to control and to adjust a cross-linking reaction according to temperature and/or spinning speed. This process further prevents and inhibits a reaction between the polymer and the cross linker. The layering process provides coupling of a cross linker and a polymer separately such that, when first coupling, a polymer cross linking is provided, adding further layers of polymer and cross linker as demanded. This process has the advantage of producing a stable membrane in a stable and uniform process in a short time period. The process may further be embedded in the roll to roll system for minimalizing the manufacturing time. The multi layering process may further comprise the step of preparing a modification solution comprising 0.125% PEI together with about 0.04% condensate such as cyanuric chloride and sulfonilic acid at room temperature for about 2 hours in order to form, at least partially, a crosslinked PEI.

EXAMPLE 1

A Nanofiltraion membrane suitable for use in accordance with embodiments of the invention was prepared in the following manner. A commercially available polysulfone or polyethersulfone PES/UF support membrane (Sepro membranes) was subjected to a cleaning step with reverse osmosis water (ROW) for 1 hour, then was immersed in aqueous solution containing 0.1% w/w of the condensate of cyanuric chloride and a sulfanilic acid for 1 hour at 70° C. After cooling and washing, the membrane was immersed in 1% polyethylenimine (PEI) solution (1% PEI, MW=750K; 1% PEI, MW=800) at room temperature (RT) and/or further followed by heat-treatment at 90° C. for 1 hour. After cooling and rinsing with ROW, the membrane was immersed in aqueous solution containing 0.1% w/w of the condensate of cyanuric chloride and a sulfanilic acid for 1 hour, then the membrane was immersed for the curing step in alkaline solution, pH 11, for 2 hours at 70° C. After this step the membrane was immersed in 0.125% polyethylenimine (PEI) solution (MW=750K) followed by heat-treatment at 90° C. for 1 hour. After cooling and rinsing with ROW, the membrane was immersed in aqueous solution containing 0.1% w/w of the condensate of cyanuric chloride and a sulfanilic acid for 1 hour, then the membrane was immersed for the curing step in alkaline solution, pH 11, for 2 hours at 70° C. After this reaction step the membrane again was immersed in 0.125% polyethylenimine (PEI) solution (MW=750K) followed by heat-treatment at 90° C. for 1 hour. After cooling and rinsing with ROW, the membrane was immersed in aqueous solution containing 0.1% w/w of the condensate of cyanuric chloride and a sulfanilic acid for 1 hour, then the membrane was immersed for the curing step in alkaline solution, pH 11, for 1 hour at 60° C. and 1 hour at 90° C. in order to order to complete the cross-linking reaction step. After rinsing the membrane with RO water the membrane was placed in 20% solution of phosphoric acid in water at 90° C. for a period of 18 hours. The membrane was removed from acid, rinsed with ROW overnight, removed and the membrane performance was measured using test cell. The membrane was found to have a flux of 92 LMH at 40 bar and 97% Glucose retention value.

Analogous membranes may be prepared, for example, by substituting cyanuric fluoride or cyanuric bromide for cyanuric chloride in the condensate with sulfanilic acid or, for example by using a condensate of two substituted triazole groups with an amine bridge.

EXAMPLE 2

Figure 1B:
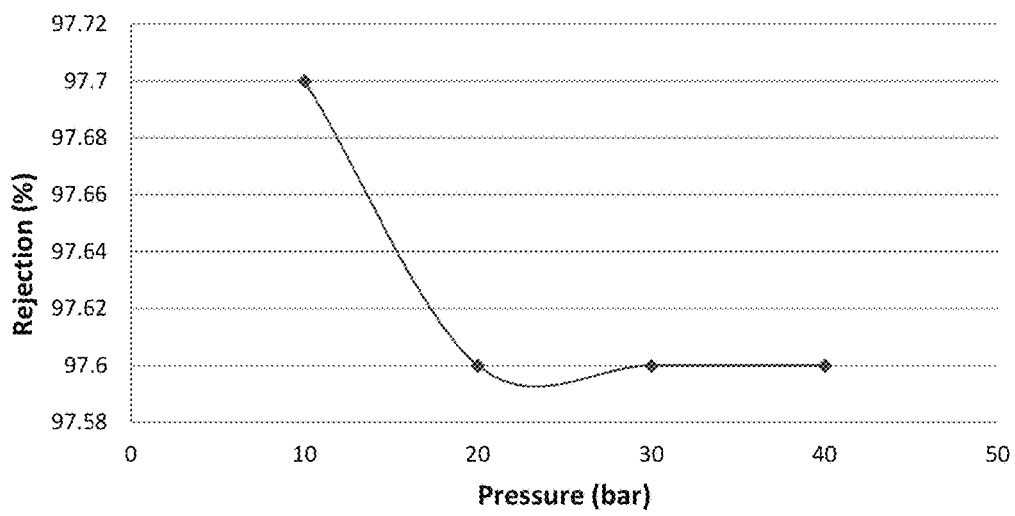

A Nanofiltration membrane was prepared according to the procedure of Example 1 was tested to various pressures from 10 bars to 40 bars at room temperature. Flux was measured with RO water. Feed solutions for rejection test were 5%$_{w/v}$ glucose in RO water. The ability of the membrane to yield flux as a function of pressure and to serve retention value as illustrated in the plot of FIG. 1 presenting Flux vs. Pressure in RO water of the membrane of the present invention.

EXAMPLE 3

Figure 2:
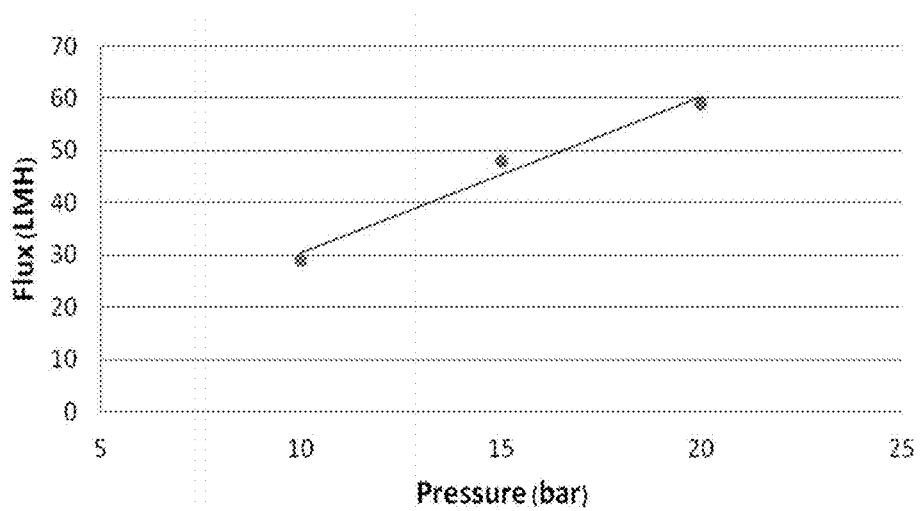
FIG. 2 presents a graph of the membrane Flux vs. Pressure in 3.5% sodium hydroxide, wherein the basic stability of one type of semipermeable membrane constructed and operative in accordance with a preferred embodiment of the present invention.

A Nanofiltration membrane was prepared according to the procedure of Example 1 was tested to various pressures 10, 15 and 20 bars with 3.5%$_{w/w}$ sodium hydroxide solution at 40° C. The ability of the membrane to yield flux as a function of pressure as shown in the plot of FIG. 2 presenting the Flux vs. Pressure in 3.5% sodium hydroxide, wherein the basic stability of one type of nanofiltration membrane constructed and operative in accordance with a preferred embodiment of the present invention.

EXAMPLE 4

Figure 3A:
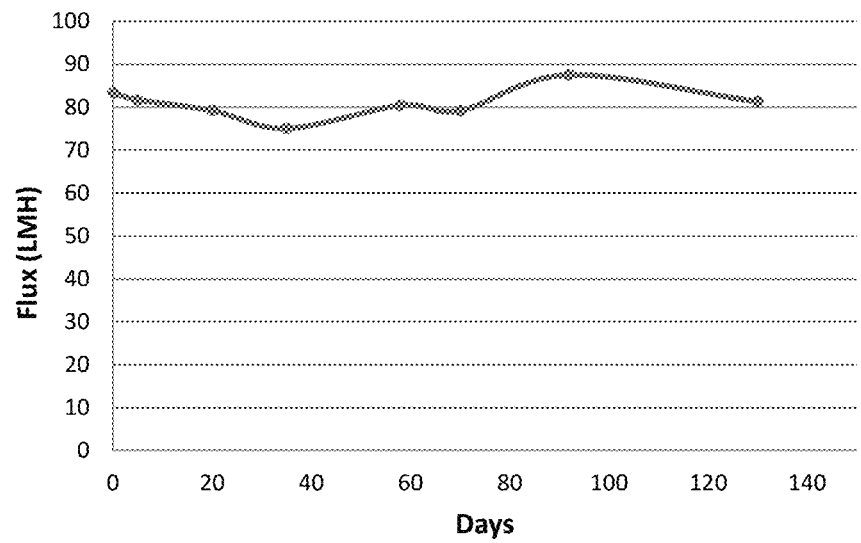
FIGS. 3A-B present a graph of the variety of soaking period in 20% sodium hydroxide solution, wherein the basic stability of one type of semipermeable membrane for long terms in accordance with a preferred embodiment of the present invention.
Figure 3B:
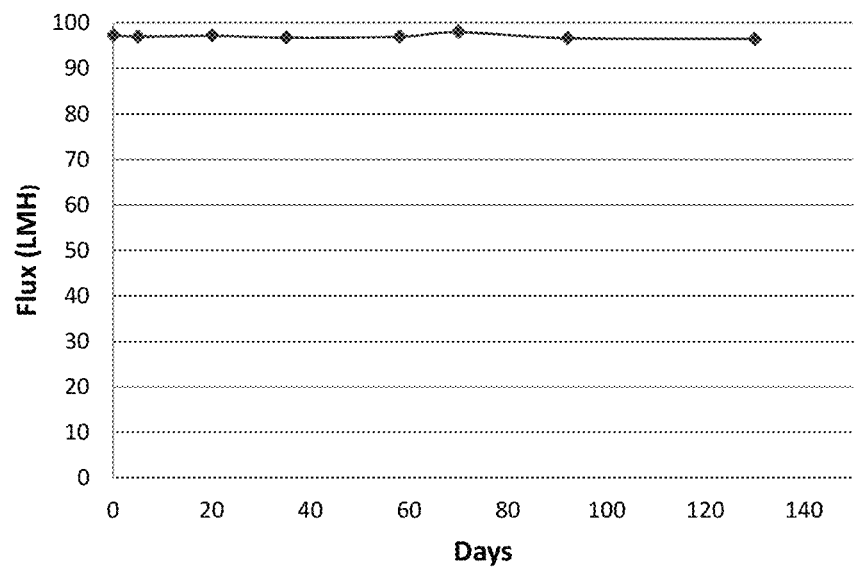

FIG. 3 further illustrates the Long term soak in 20% sodium hydroxide solution of the membrane of the present invention, wherein the basic stability of the nanofiltration membrane(prepared according to example 1) for long terms in accordance with a preferred embodiment of the present invention.

The Nanofiltration membrane was soaked in 20%$_{w/w}$ sodium hydroxide in water at 40° C. A set of membrane coupons was removed after 5, 20, 35, 58, 70, 92, 130 days. After each soaking period, the membrane coupons were washed with ROW and tested to flux and glucose retention at 40 bar and at room temperature. Feed solutions for rejection test were 5%$_{w/v}$ glucose in RO water. The flux and rejection values are given below. As the plot show, the membrane serves the initial performances after soak for long periods in 20%$_{w/w}$ sodium hydroxide in water at 40° C.

EXAMPLE 5

A Nanofiltration membrane was prepared according to the procedure of Example 1 was soaked in 10%$_{w/w}$ sodium hydroxide in water at 70° C. A set of membrane coupons was removed after 260 and 450 hours. After each soaking period, the membrane coupons were tested with 0.4%$_{w/v}$ complex Cu(ETDA) (MW=356) in 10% w/v sodium hydroxide solution at 70° C. Percent rejection was measured by recording the UV absorbance of the feed and permeates solution at 740 nm. Then the membrane was rinsed with ROW and membrane flux was measured with ROW at RT and 70° C. The working pressure for all tests was 30 bars. The flux and rejection values are given in Table 1 below.

TABLE 1

| Soaking period (hrs) | Flux (LMH), at 70° C. | Flux (LMH), at RT | Complex Cu(EDTA) in 10% NaOH solution at 70° C. | |
|---|---|---|---|---|
| | | | Rejection (%) | Flux (LMH) |
| 260 hrs | 119 | 61 | 98 | 21 |
| 450 hrs | 140 | 78 | 97.2 | 44 |

EXAMPLE 6

A Nanofiltration membrane was prepared according to the procedure of Example 1 was soaked in 1%$_{w/v}$ NaAlO$_2$ (MW=82) in 3.5%$_{w/w}$ sodium hydroxide solution at 40° C. for 240 hours (hrs) and then tested with 1% w/v NaAlO$_2$ in 3.5%$_{w/w}$ sodium hydroxide solution at 60° C. Percent rejection was measured with UV spectrometer at 548 nm UV wavelength. The working pressure for the tests was 15 bars, VCF=5. Then the membrane was rinsed with ROW and membrane flux and rejection was measured with 2000 ppm MgSO$_4$ in water solution at RT, 15 bars. The flux and rejection values are given in Table 2 below.

TABLE 2

| 2000 ppm MgSO$_4$ aqueous solution | | 1%$_{w/v}$ NaAlO$_2$ in 3.5% NaOH solution | |
|---|---|---|---|
| Rejection (%) | Flux (LMH), at RT | Rejection (%) | Flux (LMH) |
| 96.6 | 88 | 85.4 | 42 |

EXAMPLE 7

A Nanofiltration membrane was prepared according to the procedure of Example 1 was soaked in 20%$_{w/w}$ sodium hydroxide solution at 40° C. for 1500 hours. A set of membrane coupons was removed after 240 hours and tested with 0.1%$_{w/w}$ NaAlO$_2$ in 3.5%$_{w/w}$ sodium hydroxide solution at 60° C. Percent rejection was measured with UV spectrometer at 548 nm UV wavelength. The working pressure for the tests was 15 bars, VCF=15. Then the membrane was rinsed with ROW and membrane flux and rejection was measured with 2000 ppm MgSO$_4$ in water solution at RT, 15 bars. The flux and rejection values are given in Table 3 below.

TABLE 3

| 2000 ppm MgSO$_4$ aqueous solution | | 0.1%$_{w/v}$ NaAlO$_2$ in 3.5% NaOH solution | |
|---|---|---|---|
| Rejection (%) | Flux (LMH), at RT | Rejection % | Flux (LMH) |
| 97.8 | 65 | 89.8 | 50 |

EXAMPLE 8

A Nanofiltration membrane was prepared according to the procedure of example 1 was soaked in 1%$_{w/w}$, 10%$_{w/w}$ and 20%$_{w/w}$ H$_2$SO$_4$ in water at 70° C. A set of membrane coupons were removed after 72 and 480 hours. After each soaking period, the membrane coupons were washed with ROW and tested to flux and glucose retention at 40 bar and room temperature. Feed solutions for rejection test were 5%$_{w/v}$ glucose in RO water. The flux and rejection values are given in Table 4 below.

TABLE 4

| Glucose rejection (%) | Flux (LMH) in ROW | % H$_2$SO$_4$ solution | Soaking period (hrs) |
|---|---|---|---|
| 97 | 101 | 1 | 72 |
| 97.5 | 92 | 10 | |
| 97.1 | 108 | 20 | |
| 96.5 | 91 | 1 | 480 |
| 96.8 | 88 | 10 | |
| 96.7 | 96 | 20 | |

EXAMPLE 9

An NF membrane was prepared according to the procedure of Example 1, using a Polyethersulfone (PES) UF support membrane (Microdyn Nadir UP020). The membrane was found to have a flux of 80 LMH at 40 bar and 96% Glucose retention value.

In accordance with another preferred embodiment of the present invention, a method of forming a polymeric semipermeable membrane stable in solvent and acid environment is presented. The polymeric semipermeable membrane stable in solvent and acid comprising steps of providing a cross-linked UF base polymer having reactive pendant moieties preferably polyacrylonitrile (PAN) and effecting a cross-linking reaction between the reactive pendant moieties on a surface of the base polymer with an oligomer or another polymer preferably polyethylenimine PEI, thereby forming a chemical bonded skin on the surface of the base polymer.

In another embodiment of the present invention, a method of forming a solvent and acid stable semipermeable membrane wherein comprising the steps of: (a) providing a ultrafiltration (UF) base support membrane, (b) providing a aqueous solution containing condensate, (c) immersing the UF base support membrane in the aqueous solution containing condensate. The condensate is electrostatically or covalently bonded to the UF, (d) providing a solution comprising polyethylenimine (PEI), (e) forming at least one first layer upon the UF base support membrane by immersing the UF base support membrane comprising the condensate, in the solution comprising PEI for further functionalizing the first layer, (f) forming at least one second layer upon the first layer by immersing the first layer in a PEI with the condensate solution, thereby forming a cross-linked skin on the first layer.

In another embodiment, the method additionally comprising steps of repeating at least one of the steps b, c, d, e, f n times for providing n layers, wherein n is an integer equals to or greater than 1.

In another embodiment, the UF base membrane comprises cross-linked polyacrylonitrile (PAN).

In another embodiment, the step of immersing the UF base support membrane in the solution comprising PEI additionally comprising step of contacting the UF support membrane with 0.1% to about 1% polyethylenimine (PEI) solution followed by heat-treatment at a temperature of about 70 to about 90° C.

In another embodiment, the method additionally comprising step of forming a Nanofiltration base membrane comprising at least one di-, tri- or tetra-halo substituted diazine or triazine-containing monomer, oligomer or polymer, and at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl.

In another embodiment, the Nanofiltration layer comprises at least one di-, tri- or tetra-halo substituted diazine or triazine-containing monomer, oligomer or polymer, and at least one multifunctional amine having a molecular weight in the range of 400 to 750,000, provided that at least one of the di-, tri- or tetra-halo substituted diazine or triazine-containing monomer, oligomer or polymer is not a di- or triazine monomer which is substituted only by Cl.

In another embodiment, the Nanofiltration membrane, when exposed to a solvent or acid environment shows more than 95% Glucose retention value. In another embodiment, the membrane after soaking the membrane in 20%$_{w/w}$ H$_2$SO$_4$ at 90° C. for a period of about 24 to 300 hours, yield more than 96% glucose rejection, (see Table 5)

In another embodiment, the membrane after soaking the membrane in 100%$_{w/w}$ N-methylpyrrolidone (NMP) at 60° C. for a period of about 24 to 300 hrs, yield more than 96% glucose rejection, (see Table 5)

EXAMPLE 10

An NF membrane was prepared according to the procedure of Example 1, but a cross-linked polyacrylonitrile (PAN) UF support membrane was instead of PES/UF support membrane (from Sepro membranes). The membrane was found to have a flux of 71 LMH at 40 bar and 97% Glucose retention value.

EXAMPLE 11

A NF membrane was prepared according to the procedure of Example 10 was placed in 20%$_{w/w}$ H$_2$SO$_4$ in water at 90° C. A set of membrane coupons were removed after 24, 100 and 300 hrs. After each soaking period, the membrane coupons were washed with ROW and tested to flux and glucose retention at 40 bar and room temperature. Feed solutions for rejection test were 5%$_{w/v}$ glucose in RO water. The flux and rejection values are given below. As illustrated in the plot, the membrane serves the initial performances after been soaked for long periods in 20%$_{w/w}$ H$_2$SO$_4$ in water at 90° C. The flux and rejection values are given in Table 5 below.

TABLE 5

| Soaking period in 20% H$_2$SO$_4$, 90° C., (hrs) | Glucose rejection (%) | Flux (lmh) in ROW |
|---|---|---|
| 24 | 97.2 | 88 |
| 100 | 96.6 | 96 |
|  | 97 | 94 |

EXAMPLE 12

A NF membrane was prepared according to the procedure of Example 10 was placed in pure N-methylpyrrolidone (NMP) at 60° C. A set of membrane coupons were removed after 24, 100 and 300 hrs. After each soaking period, the membrane coupons were washed with ROW and tested to flux and glucose retention at 40 bar and room temperature. Feed solutions for rejection test were 5%$_{w/v}$ glucose in RO water. The flux and rejection values are given below. As the plot show, the membrane serves the initial performances after soak for long periods in pure N-methylpyrrolidone (NMP) at 60° C. The flux and rejection values are given in Table 6 below.

TABLE 6

| Soaking period in NMP, 60° C., (hrs) | Glucose rejection (%) | Flux (lmh) in ROW |
|---|---|---|
| 24 | 97.2 | 69 |
| 100 | 97.2 | 67 |
|  | 96.7 | 96 |

EXAMPLE 13

A Nanofiltraion membrane suitable for use in accordance with the embodiments of the present invention was prepared in the following manner. A commercially available PES/UF support membrane was subjected to a cleaning step with alkaline solution, pH 11 at 90° C. for 1 hour, and then with reverse osmosis water (ROW) for 30 min.

A Modification solution was previously prepared as following: aqueous solution of the condensate of cyanuric chloride and a sulfanilic acid is added with stirring to aqueous solution of polyethylenimine (PEI). The solution was heated to 50° C. for 3 hour, cooled and diluted to requested concentration. The membrane was immersed in modification solution for 18 hours at a room temperature (RT), and further heated to 50° C. for 1 hour. After cooling and rinsing with ROW, the membrane was immersed in aqueous solution containing 0.1% w/w of the condensate of cyanuric chloride and a sulfanilic acid for 1 hour. The membrane was further immersed for the curing step in alkaline solution, pH 11, for 2 hours at 70° C. After cooling and rinsing with ROW, the membrane was further immersed in aqueous solution containing 0.1% w/w of the condensate of cyanuric chloride and a sulfanilic acid for 1 hour. The membrane was immersed in modification solution for 1 hour at RT following with curing step in alkaline solution, pH 11, for 2-3 hours at 60-90° C. After cooling and rinsing with ROW, the membrane was immersed in aqueous solution containing 0.1% w/w of the condensate of cyanuric chloride and a sulfanilic acid for 1 hour. The membrane was immersed for the curing step in alkaline solution, pH 11, for 2 hour at 60° C. and 2 hour at 90° C. in order to order to complete the cross-linking reaction step and was rinsing with RO water.

EXAMPLE 14

A Nanofiltration membrane was prepared according to the procedure of example 13 was placed in 20% solution of phosphoric acid in water at 90° C. for a period of 18 hours. The membrane was removed from acid, rinsed with ROW overnight, removed and the membrane performance was measured using test cell. The membrane was found to have a flux of 120 LMH at 40 bar and 98% Glucose retention value.

EXAMPLE 15

A Nanofiltration membrane was prepared according to the procedure of example 13 was placed in 30% solution of phosphoric acid in water at 90° C. for a period of 18 hours. The membrane was removed from acid, rinsed with ROW overnight, removed and the membrane performance was measured using test cell. The membrane was found to have a flux of 133 LMH at 40 bar and 98% Glucose retention value.

EXAMPLE 16

A Nanofiltration membrane was prepared according to the procedure of example 13 was placed in 10% solution of sodium hydroxide in water at 70° C. for a period of 64 hours. The membrane was removed from sodium hydroxide, rinsed with ROW overnight, removed and the membrane performance was measured using test cell. The membrane was found to have a flux of 133 LMH at 40 bar and 98% Glucose retention value.

EXAMPLE 17

A Nanofiltration membrane was prepared according to the procedure of example 13 was placed in 10% solution of sodium hydroxide in water at 70° C. for a period of 240 hours. The membrane was removed from sodium hydroxide, rinsed with ROW overnight, removed and the membrane performance was measured using test cell. The membrane was found to have a flux of 135 LMH at 40 bar and 98% Glucose retention value.

EXAMPLE 18

A Nanofiltration membrane was prepared according to the procedure of example 14 was placed in 10% solution of sodium hydroxide in water at 70° C. for a period of 54 hours. The membrane was removed from sodium hydroxide, rinsed with ROW overnight, removed and the membrane performance was measured using test cell. The membrane was found to have a flux of 150 LMH at 40 bar and 97% Glucose retention value.

EXAMPLE 19

A Nanofiltration membrane was prepared according to the procedure of example 15 was placed in 10% solution of sodium hydroxide in water at 70° C. for a period of 54 hours. The membrane was removed from sodium hydroxide, rinsed with ROW overnight, removed and the membrane performance was measured using test cell. The membrane was found to have a flux of 166 LMH at 40 bar and 97% Glucose retention value.

EXAMPLE 20

A NF membrane was prepared according to the procedure of Example 13, but a cross-linked polyacrylonitrile (PAN) UF support membrane was instead of PES/UF support membrane (from Sepro membranes). The membrane was found to have a flux of 80 LMH at 40 bar and 98% for $MgSO_4$ retention value in 2000 ppm $MgSO_4$ solution.

EXAMPLE 21

An NF membrane prepared according to the procedure of example 8 was placed in $20\%_{w/w}$ $H_2SO_4$ in water at 90° C. A set of coupons were removed after 24, 100, 360 and 600 hrs. After each soaking period, the coupons were washed with ROW and tested to flux and $MgSO_4$ retention at 40 bar and room temperature. Feed solutions for rejection test were with 2000 ppm $MgSO_4$ solution. The flux and rejection values are given below. As the plot show, the membrane serves the initial performances after soak for long periods in $20\%_{w/w}$ $H_2SO_4$ in water at 90° C. The flux and rejection values are given in Table 7 below.

TABLE 7

| Flux (lmh) in ROW | $MgSO_4$ rejection (%) | Soaking period in 20% $H_2SO_4$, 90° C., (hrs) |
|---|---|---|
| 60 | 98 | 24 |
| 57 | 95 | 100 |
| 64 | 95 | 360 |
| 70 | 95 | 600 |

In the foregoing description, embodiments of the invention, including preferred embodiments, have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A base stable semipermeable nanofiltration (NF) membrane, wherein said NF membrane is prepared by a process comprising steps of:
   a. providing an ultrafiltration (UF) base support membrane selected from the group consisting of polyethersulfone (PES) and polysulfone (PS); said UF base membrane is a non-crosslinked base polymer;
   b. providing a modification solution comprising water soluble partially crosslinked polyethylenimine (PEI) or non-crosslinked PEI;
   c. activating the surface of said UF membrane by subjecting said UF membrane to heating in an aqueous solution containing 0.1% (w/w) of the condensate of cyanuric chloride with sulfanilic acid for 1 hour at a temperature of 70° C.;

d. forming a first crosslinked layer upon at least a portion of a surface of said UF base support membrane of step (c); said forming comprises steps of:
 i. providing said modification solution to comprise 1% (w/w) water soluble partially crosslinked PEI or 1% (w/w) oligomer-polymer mixture of water soluble non-crosslinked PEI (PEI MW 800 and PEI MW 750K at a ratio of 1:1);
 ii. preparing said modification solution to comprise partially crosslinked PEI by admixing an aqueous solution of said condensate of cyanuric chloride with sulfanilic acid within an aqueous solution of said PEI oligomer-polymer mixture at a ratio of said condensate to said PEI being 0.3:1.0, with subsequent heating of said modification solution at 50° C. for 3 hours;
 iii. immersing said UF base support membrane in said prepared 1% (w/w) modification solution to comprise a partially crosslinked PEI, for 18 hours at a room temperature, then subsequent heat-treating said membrane in either modification solution for 1 hour at 50° C. or in prepared 1% (w/w) solution comprising oligomer-polymer mixture of non-crosslinked PEI (PEI MW 800 and PEI MW 750K at a ratio of 1:1) for 1 hour at 90° C.;
 iv. after cooling and washing, contacting said UF base support membrane of step (iii) with aqueous solution comprising 0.1% w/w of the condensate of cyanuric chloride with sulfanilic acid for 1 hour at room temperature; and
 v. curing said UF base support membrane of step (iv) in an alkaline solution, pH=11, for 2 hours at 70° C. to complete the formation of the first cross-linked layer upon said activated UF base support membrane;

e. forming a second crosslinked layer upon said first layer of said UF base support membrane of step (d) comprising steps of:
 i. providing a modification solution comprising water soluble partially crosslinked PEI prepared according to step (d, ii) and diluted to either concentration of 0.125% (w/w) or 0.125% (w/w) of non-crosslinked PEI, prepared from PEI, MW 750K;
 ii. contacting said UF base support membrane of step (d, v) with an aqueous solution comprising 0.1% w/w of the condensate of cyanuric chloride with sulfanilic acid for 1 hour at room temperature;
 iii. immersing said UF base support membrane of step (ii) in 0.125% (w/w) modification solution for 1 hour at room temperature for partially crosslinked PEI or alternatively at 90° C. for non-crosslinked PEI;
 iv. heat-treatment of said UF base support membrane in alkaline solution, pH=11, for 2-3 hours at 60-90° C.;
 v. cooling and rinsing said UF base support membrane with reverse osmosis (RO) water;
 vi. immersing said UF membrane of step (v) in an aqueous solution comprising 0.1% w/w of the condensate of cyanuric chloride with sulfanilic acid for 1 hour at room temperature; and,
 vii. heat-treating in an alkaline solution, pH=11, for 2 hours at 60° C., followed by 2 hours at 90° C. to complete the formation of the second crosslinked layer upon said UF membrane with said first crosslinked layer, said second crosslinked layer is a NF layer;

f. repeating said step (e) n times for providing NF membrane with n+1 multiple cross-linked layers upon said first layer of said UF base support membrane; n is an integer number equals to or greater than 1; and, g. immersing said base stable semipermeable NF membrane in 20% solution of phosphoric acid in water at a temperature ranging from 70° C. to 90° C. for a period of time ranging from 18 to 24 hours.

2. The base stable semipermeable NF membrane according to claim 1, wherein the following holds true:
 a. said step (a) of providing UF base support membrane is with molecular weight cut-off (MWCO) in the range of 5 kD to 30 kD;
 b. said step (c) of subjecting said UF support membrane to heating before forming the first NF layer in aqueous solution containing 0.05 to 0.3% w/w of condensate of cyanuric chloride with sulfanilic acid for a period of time ranging from 1 to 3 hours at a temperature of not more than 70° C.; and,
 c. said NF membrane is stable in an environment having a pH in the range of 2 to 14.

3. The base stable semipermeable NF membrane according to claim 1, wherein the following holds true:
 a. said NF membrane, after soak testing with 20%$_{w/w}$NaOH in water at 40° C., yields more than 97% glucose rejection;
 b. said NF membrane, when exposed to 20% w/w NaOH solution at 40° C. for 130 days, maintains the initial performance with glucose rejection of 97%;
 c. said NF membrane, when exposed to 10% w/w NaOH solution at 70° C. for 450 hours, removes 97% of Cu(ETDA) at a flux greater than 21 LMH from a feed solution of 0.4% w/w Cu(ETDA) in 10% NaOH when the feed solution is applied to said NF layer at a feed pressure of 30 bar and a temperature of 25° C.; and,
 d. said NF membrane, when exposed to 1% w/v NaAlO$_2$ in 3.5% w/w NaOH solution as feed, at a feed pressure of 15 bars and a temperature of 40° C. for 240 hours, removes 85.4% of impurities as NaAlO$_2$.

4. The base stable semipermeable NF membrane according to claim 1, wherein said NF membrane comprising multiple crosslinked layers, said crosslinked layers comprising a matrix which is bound to said UF base support membrane, said matrix has been formed from at least one di-, tri- or tetra-halo substituted diazine or triazine-containing monomer, oligomer or polymer, and at least one multi-functional amine having a molecular weight in the range of about 400 to about 750,000, provided that at least one of the di-, tri- or tetra-halo substituted diazine or triazine-containing monomer, oligomer or polymer is not a di- or triazine monomer which is substituted only by Cl, and any combination thereof; said diazine or triazine-containing monomer or oligomer is selected from the group consisting of:

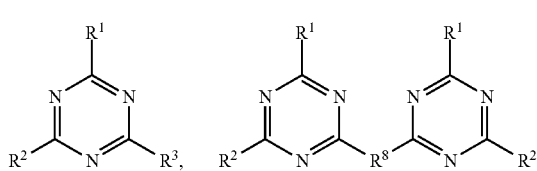

-continued

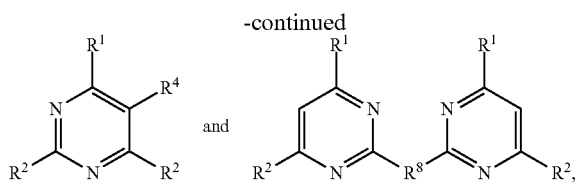

and said $R^1$ is independently selected at each occurrence from bromo, chloro, iodo, fluoro, —$NHR^5$, —$OR^5$ and $SR^5$, wherein $R^5$ is independently selected at each occurrence from H, optionally substituted alkyl and optionally substituted aryl;

$R^2$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;

$R^3$ is independently selected at each occurrence from bromo, chloro, fluoro, —$NHR^5$, —$OR^5$ and $SR^5$, wherein $R^5$ is independently selected at each occurrence from H, optionally substituted alkyl and optionally substituted aryl;

$R^4$ is selected from H, bromo, chloro, fluoro, —$NHR^5$, —$OR^5$ and $SR^5$, wherein $R^5$ is independently selected at each occurrence from H, optionally substituted alkyl and optionally substituted aryl; and $R^8$ is independently selected at each occurrence from —$NH^2$— and —NH-A-NH—, wherein A is selected from $C_{1-20}$ aliphatic moieties, $C_{6-10}$ aromatic moieties, and combinations thereof;

provided that at at least two occurrences, $R^1$, $R^2$, $R^3$ and $R^4$, taken together, are selected from bromo, chloro and fluoro, and further provided that when both $R^1$ and $R^2$ on a single ring are Cl, at least one of $R^3$ and $R^4$ is not Cl.

5. The base stable semipermeable nanofiltration (NF) membrane of claim 1, wherein said first crosslinked layer is electrostatically bound to said base membrane.

* * * * *